(12) United States Patent
Iwamoto

(10) Patent No.: US 7,715,025 B2
(45) Date of Patent: May 11, 2010

(54) OPTICAL DISPLACEMENT MEASURING APPARATUS

(75) Inventor: Tadashi Iwamoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 195 days.

(21) Appl. No.: 12/107,981

(22) Filed: Apr. 23, 2008

(65) Prior Publication Data

US 2008/0266576 A1 Oct. 30, 2008

(30) Foreign Application Priority Data

Apr. 27, 2007 (JP) ............................. 2007-119567

(51) Int. Cl.
*G01B 11/14* (2006.01)
(52) U.S. Cl. ...................................... 356/614
(58) Field of Classification Search ........................ None
See application file for complete search history.

(56) References Cited

U.S. PATENT DOCUMENTS

| 6,339,564 B2 * | 1/2002 | Tezuka et al. | ............ | 369/44.23 |
| 6,943,888 B2 * | 9/2005 | Ishikawa | .................... | 356/446 |
| 7,170,677 B1 * | 1/2007 | Bendall et al. | .............. | 359/464 |
| 7,330,278 B2 | 2/2008 | Iwamoto et al. | | |

FOREIGN PATENT DOCUMENTS

| JP | 2005-265616 | 9/2005 |
| JP | 2006-058115 | 3/2006 |

\* cited by examiner

*Primary Examiner*—Tu T Nguyen
(74) *Attorney, Agent, or Firm*—Rankin, Hill & Clark LLP

(57) ABSTRACT

An optical displacement measuring apparatus includes a light source, a collimate lens, a mirror, and a truncated cone shaped prism, and includes an imaging lens and a pinhole optical device for extracting light parallel to an optical axis of incident light from light returned from an object through the truncated cone shaped prism, and an optical position detector. The truncated cone shaped prism has optical properties of converting only light returned to a truncated conical circumference surface at a fixed angle corresponding to an apex angle into light parallel to an optical axis of incident light. The parallel light is offset from an optical axis of incident light in accordance with a displacement of the object relative to the truncated cone shaped prism. The optical position detector detects an offset amount to measure the displacement of the object.

20 Claims, 8 Drawing Sheets

OPTICAL DISPLACEMENT MEASURING APPARATUS

This application claims priority to Japanese Patent Application No. 2007-119567 filed on Apr. 27, 2007, which is incorporated herein by reference in its entirety.

BACKGROUND OF THE INVENTION

1. Field of the Invention

The present invention relates to an optical displacement measuring apparatus, and, more particularly, to an optical displacement measuring apparatus for introducing light from a light source through an objective optical system to an object to be measured, and detecting light reflected from the object to be measured in a detection unit to measure a displacement of the object to be measured relative to the objective optical system.

2. Description of the Related Art

Japanese Patent Publications JP 2005-265616 and JP 2006-58115 describe, as means for measuring a displacement of an object in a non-contact manner, conventional technologies such as "a triangulation system using light", "an optical probe method", and "an automatic focusing technique".

Here, in the "triangulation system using light", a light beam is irradiated from a semiconductor laser or the like to a surface to be measured, and light reflected from the irradiated surface is imaged by means of a condenser lens onto an optical position detector placed in a direction which differs from an irradiation direction. According to this method, because the movement of the surface brings about changes in position of the beam on the position detector, a displacement of the surface to be measured can be determined rapidly according to a principle of a triangulation method. However, on the principle of the triangulation method, it is necessary for the light source to be placed at a sufficient distance from the optical position detector in order to realize high-precision measurement. Accordingly, because sufficient space available for measurement is needed in the vicinity of the surface to be measured, the triangulation system using light is unfit for use in displacement measurement of an object such as a workpiece housed in a casing having a small mouth.

The "optical probe method" includes a critical angle method, an astigmatic method, a knife edge method, a heterodyne method, and other methods. In any of these methods, minute spot light is imaged on an object, and reflected light from the object is collected to detect a condition of the reflected light. Thus, these methods can achieve highly sensitive detection, and apparatuses employing these methods can be designed as a small and light-weight configuration and may be used, for example, as an optical probe for optical measurement of surface roughness. However, because a detection range with high precision is limited to an area close to a focused position, this method suffers from a very narrow measurable range. In general, the measurement is available only within, for example, a range of several micrometers. In addition, the method also has a problem that a measured value varies depending on a surface condition of the object.

In the "automatic focusing technique", because focusing is always obtained on an object by moving a lens, a displacement of the object can be measured from a travel distance of the lens. Therefore, this technique can realize a broader measurement range. However, in automatic focusing operation, for example, when a surface of the object has discontinuous displacements due to the presence of unevenness such as steps, the lens is at risk of losing its tracking direction, thereby necessitating a new search operation. Accordingly, it is, in some cases, difficult to perform high-speed measurement using the auto-focusing technique.

JP 2005-265616 discloses an optical displacement measurement device including a conical objective lens placed in front of an object and using optical properties as described below. Light emitted from behind the objective lens is introduced into the objective lens and refracted on a cone-shaped interface of the objective lens to irradiate the object, and light reflected from the object is returned to the objective lens, refracted again by the cone-shaped interface, and delivered in parallel to the light which is initially emitted. It is further described that because the light returned from the objective lens is offset from a central optical axis of the objective lens according to a distance between the object and the objective lens, i.e. an amount corresponding to a displacement of the object, the displacement of the object can be measured based on an amount of the offset.

On the other hand, JP 2006-58115 discloses an optical displacement measurement device in which a conical objective prism is placed in front of an object to be measured, and outbound light shifted in parallel with a central optical axis of the objective prism is introduced from behind the objective prism to the object. Also in this case, the outbound light having passed through the objective prism is reflected from the object and returned to the objective prism through which the light is converted into inbound light which is parallel to the initially emitted outbound light. An offset amount of the inbound light from the central optical axis varies depending on the displacement of the object to be measured. It is further described that the inbound light is focused by a condenser lens at a focus point, to thereby suppress effects of scattered light by means of a pinhole optical device disposed at the focus point.

When the conical objective optical systems described in the above-described Publications JP 2005-265616 and JP 2006-58115 are used, an end section can be made compact in size, so that a displacement of a workpiece housed in a casing whose mouth is small can be measured. In addition, mechanical operation is not needed, and a wide range of measurement can be realized at high speed. However, in the teachings of the above-described Publications, light introduced through the conical objective optical system to the object to be measured is obliquely irradiated on the object. The use of such oblique incident light may result in the occurrence of an event that when the object to be measured has an uneven surface including, for example, bumps and dips or elevation changes, a position struck by the incident light varies depending on the displacement of the object to be measured, which would introduce an error into a displacement measuring result.

SUMMARY OF THE INVENTION

Therefore, the present invention advantageously provides an optical displacement measuring apparatus capable of performing high-precision displacement measurement even when an object to be measured has an uneven surface.

The optical displacement measuring apparatus according to an aspect of the present invention comprises an objective optical system and a detection section, for introducing light from a light source through the objective optical system to an object to be measured, and detecting light reflected from the object to be measured in the detection section to measure a displacement of the object relative to the objective optical system. In the optical displacement measuring apparatus, the objective optical system is a truncated cone shaped prism which includes a broad-area flat portion and a narrow-area flat portion, each of whose flat surface is perpendicular to an optical axis, and includes a truncated conical circumference surface for connecting the broad-area flat portion and the narrow-area flat portion. Further, the truncated cone shaped prism is placed at a position where an apex angle side having the narrow-area flat portion is opposed to the object to be measured, to thereby introduce the light from a broad-area flat portion side through a narrow-area flat portion side to the object to be measured, receive the light reflected from the object to be measured on the truncated conical circumference surface, and direct the reflected light toward the detection section.

Further, it is preferable that the truncated cone shaped prism has, in a central area thereof, a through hole for allowing the light from the light source to pass therethrough.

The optical displacement measuring apparatus according to another aspect of the present invention comprises an objective optical system and a detection section, for introducing light from a light source through the objective optical system to an object to be measured, and detecting light reflected from the object to be measured in the detecting section to measure a displacement of the object relative to the objective optical system. In the optical displacement measuring apparatus, the objective optical system is a truncated semi-cone shaped prism formed in a shape of a cylindrical column by trimming the truncated cone shaped prism which includes the broad-area flat portion and the narrow-area flat portion, each of whose flat surface is perpendicular to an optical axis, and includes the truncated conical circumference surface for connecting the broad-area flat portion and the narrow-area flat portion, and shifting a central axis of the narrow-area flat portion from a central axis of the cylindrical column. Further, the truncated semi-cone shaped prism is placed at a position where a narrow-area flat portion side is opposed to the object to be measured, to thereby introduce the light from a broad-area flat portion side through the narrow-area flat portion side to the object to be measured, receive the light reflected from the object to be measured on the truncated conical circumference surface, and direct the reflected light toward the detection section.

The optical displacement measuring apparatus according to still another aspect of the present invention comprises an objective optical system and a detection section, for introducing light from a light source through the objective optical system to an object to be measured, and detecting light reflected from the object to be measured to measure a displacement of the object to be measured relative to the objective optical system. In the optical displacement measuring apparatus, the objective optical system is a frustum-cylinder shaped prism which includes a broad-area flat portion and a narrow-area flat portion, each of whose flat surface is perpendicular to an optical axis, and includes an inclined surface for connecting the broad-area flat portion and the narrow-area flat portion. The frustum-cylinder shaped prism is place at a position where a narrow-area flat portion side is opposed to the object to be measured, to thereby introduce the light from a broad-area flat portion side through the narrow-area flat portion side to the object to be measured, receive the light reflected from the object to be measured on the inclined surface, and direct the reflected light toward the detection section.

The optical displacement measuring apparatus according to a further aspect of the present invention comprises an objective optical system and a detection section, for introducing light from a light source through the objective optical system to an object to be measured, and detecting light reflected from the object to be measured to measure a displacement of the object to be measured relative to the objective optical system. In the optical displacement measuring apparatus, the objective optical system is a triangular prism which includes a flat surface perpendicular to an optical axis along which the light is incident upon the object to be measured and an oblique surface which is inclined with respect to the flat surface. The triangular prism is place at a position where an oblique surface side is opposed to the object to be measured, to thereby introduce the light to the object to be measured without causing the light to pass through the triangular prism, receive the light reflected from the object to be measured on the oblique surface, and direct the reflected light toward the detection section.

Further, it is preferable that the optical displacement measuring apparatus according to the present invention comprises an incident optical system which includes a polarization beam splitter for changing a direction of the optical axis of light from the light source to direct the light toward the objective optical system, and a quarter-wavelength plate.

It is also preferable that the optical displacement measuring apparatus according to the present invention comprises an imaging lens installed between the objective optical system and the detection section, and a pinhole optical device disposed at a focus position of the imaging lens between the imaging lens and the detection section.

In addition, it is preferable that the optical displacement measuring apparatus according to the present invention comprises a detecting optical system which has a restoration lens for returning detection-subject light having passed through the pinhole optical device to cylindrical-shaped light parallel to the optical axis, and a truncated cone shaped prism disposed at a position where an apex angle side is opposed to the detection section, to thereby again converge the cylindrical-shaped light parallel to the optical axis having been restored by the restoration lens.

According to at least one of the above-described aspects, the objective optical system in the optical displacement measuring apparatus is the truncated cone shaped prism which includes the broad-area flat portion and the narrow-area flat portion, each of whose flat surface is perpendicular to the optical axis, and includes the truncated conical circumference surface for connecting the broad-area flat portion and the narrow-area flat portion. Further, the truncated cone shaped prism is placed at a position where an apex angle side having the narrow-area flat portion is opposed to the object to be measured, to thereby introduce the light from the broad-area flat portion side through the narrow-area flat portion side to the object to be measured, receive the light reflected from the object to be measured on the truncated conical circumference surface, and direct the reflected light toward the detection section. Therefore, a narrow beam of light having a cross-sectional area smaller than an area of the flat surface in the narrow-area flat portion is vertically incident upon the object to be measured. In this way, even when the object to be measured has an uneven surface, it is possible to prevent a position struck by the incident light varying depending on the displacement of the object to be measured, which makes it possible to conduct displacement measurement with a high degree of precision.

Further, because the truncated cone shaped prism has, in the central area thereof, the through hole for allowing light from the light source to pass therethrough, both a loss of light incident upon the object to be measured and internal reflection caused by the presence of a prism can be prevented from occurring.

According to at least one of the above-described aspects, the objective optical system in the optical displacement measuring apparatus is the truncated semi-cone shaped prism formed in the shape of the cylindrical column by trimming the truncated cone shaped prism which includes the broad-area flat portion and the narrow-area flat portion, each of whose flat surface is perpendicular to the optical axis, and includes the truncated conical circumference surface for connecting the broad-area flat portion and the narrow-area flat portion, and shifting the central axis of the narrow-area flat portion from the central axis of the cylindrical column. This configuration has a feature that a narrow beam of light having a cross-sectional area smaller than an area of the flat surface in the narrow-area flat portion is vertically incident on the object to be measured, which is identical to the feature of the truncated cone shaped prism. Therefore, it is also possible to prevent the position struck by incident light varying depending on the displacement of the object to be measured, which makes it possible to conduct displacement measurement with a high degree of precision. In addition, because an axis of light incident upon the object to be measured is shifted from the central axis of the cylindrical column, a wider angle can be established between the incident light and detection-subject light as long as the truncated semi-cone shaped prism has a size equivalent to that of the truncated cone shaped prism, which can yield an improvement in a displacement resolution. As a result, it becomes possible to downsize an end part of the displacement measuring apparatus.

Still further, according to at least one of the above-described aspects, the objective optical system in the optical displacement measuring apparatus is the frustum-cylinder shaped prism which includes the broad-area flat portion and the narrow-area flat portion, each of whose flat surface is perpendicular to the optical axis, and includes the inclined surface for connecting the broad-area flat portion and the narrow-area flat portion. This configuration has a feature that a narrow beam of light having a cross-sectional area smaller than the area of the flat surface in the narrow-area flat portion is vertically incident on the surface of the object to be measured, which is identical to the feature of the truncated cone shaped prism. Therefore, it is also possible to prevent the position struck by incident light varying depending on the displacement of the object to be measured, which makes it possible to conduct displacement measurement with a high degree of precision. Also, in this configuration, a wider angle can be established between the incident light and detection-subject light as long as the frustum-cylinder shaped prism has a size equivalent to that of the truncated cone shaped prism, which can yield an improvement in the displacement resolution. As a result, it becomes possible to downsize the end part of the displacement measuring apparatus.

Further, according to at least one of the above-described aspects, the objective optical system in the optical displacement measuring apparatus is the triangular prism which includes the flat surface perpendicular to the optical axis along which light is irradiated on the object to be measured and the oblique surface which is inclined with respect to the flat surface. Then, light is irradiated on the object to be measured without passing through the triangular prism, and the light reflected from the object to be measured is received on the oblique surface and directed toward the detection section. Also in this configuration, because the narrow beam of light having the smaller cross-sectional area can be vertically incident on the surface of the object to be measured, it is possible to prevent the position struck by incident light varying depending on the displacement of the object to be measured, which makes it possible to conduct displacement measurement with a high degree of precision.

Yet further, the optical displacement measuring apparatus comprises the incident optical system which includes the polarization beam splitter for changing the direction of the optical axis of light emitted from the light source to direct the light toward the objective optical system, and the quarter-wave plate. In contrast with an instance of using a reflecting mirror to change the direction of the optical axis, it is possible in the above-described configuration to eliminate interference between return light and the mirror that will occur when the object to be measured is located at a short distance from the objective optical system.

Further, the optical displacement measuring apparatus comprises the imaging lens installed between the objective optical system and the detecting section, and a pinhole optical device disposed at the focus position of the imaging lens between the imaging lens and the detecting section. Even when the narrow beam of light is vertically irradiated on the surface of the object to be measured by means of the objective optical system formed in the truncated cone shape or the like, reflected light travels in a wide range of reflection directions if the object to be measured has an uneven surface within a range of an illumination area of the narrow beam of light. In the truncated cone shaped prism, the truncated semi-cone shaped prism, the frustum-cylinder shaped prism, or the triangular prism, only a specific range of reflected light is converted into a light beam parallel to the optical axis of incident light based on both an apex angle of an inclined surface shape of the prism and a displacement of the object to be measured. A deviation of an optical axis of the parallel light beam from the optical axis of incident light is increased as the displacement of the object to be measured becomes greater. When the parallel light beam passes via the imaging lens through the pinhole optical device, an optical path of the light is changed in accordance with the displacement of the object to be measured. Thus, the displacement of the object to be measured can be determined by detecting the optical path of the light in an appropriate detection means.

Then, because, in the truncated cone shaped prism, the truncated semi-cone shaped prism, the frustum-cylinder shaped prism, or the triangular prism, only the specific range of reflected light is converted into the light beam parallel to the optical axis of incident light based on both the apex angle of the inclined surface shape of the prism and the displacement of the object to be measured, the imaging lens can be used in conjunction with the pinhole optical device for allowing only the specific range of reflected light having been converted into the light beam parallel to the optical axis of incident light to pass through the pinhole optical device. Accordingly, other light beams, i.e. beams which are contained in light reflected in the widespread directions when the object to be measured has the uneven surface and which are not in parallel to the optical axis of incident light can be prohibited from traveling toward the detecting section.

In addition, the optical displacement measuring apparatus may include, as the detecting optical system, the restoration lens for converting detection-subject light having passed through the pinhole optical device into cylindrical light parallel to the optical axis, and a truncated cone shaped prism which is placed at a position where an apex angle side is opposed to the detection section, to again converge the cylindrical light parallel to the optical axis having been restored by the restoration lens. Because the light beam having passed through the pinhole optical device is converged as described above, detection sensitivity can be enhanced, or power of the light source can be minimized.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Several embodiments of the configuration of an optical displacement measuring apparatus will be described along with preferred forms of an objective optical system, an incident optical system, and a detecting optical system. It is to be understood that these embodiments and preferred forms may be employed in the optical displacement measuring apparatus alone, or in combination with one or more of the other embodiments or forms. Further, specific features, such as a material, are provided merely as an example, and may be appropriately changed in accordance with specifications of an optical displacement measuring apparatus.

Embodiment 1

Figure 1:
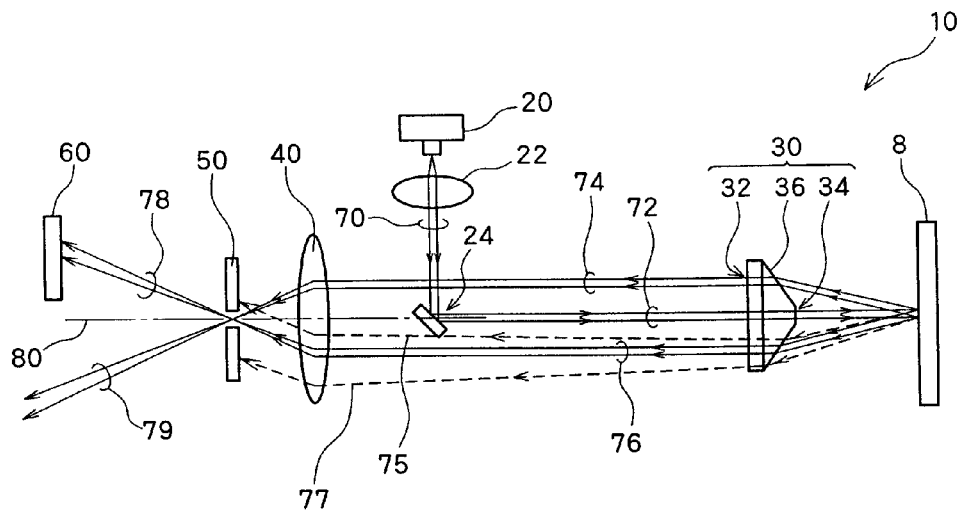
FIG. 1 shows a configuration of an optical displacement measuring apparatus according to an embodiment of the present invention.

FIG. 1 shows a configuration of an optical displacement measuring apparatus 10. An object to be measured 8, which is not a component of the optical displacement measuring apparatus 10, is also illustrated in FIG. 1. In the optical displacement measuring apparatus 10, optical properties of a truncated cone shaped prism are utilized to measure a displacement. Here, the truncated cone shaped prism is an optical device including a broad-area flat portion and a narrow-area flat portion, each of which has a flat surface perpendicular to an optical axis, in addition to a truncated conical circumference surface which connects the broad-area flat portion and the narrow-area flat portion. In order to measure a displacement of the object to be measured, light from a light source is introduced through a center of the truncated cone shaped prism, i.e. the narrow-area flat portion, to the object to be measured, and light reflected from the object is received on the truncated conical circumference surface of the truncated cone shape and returned.

The truncated cone shaped prism has an optical property of converting only a light beam, which is returned to the truncated conical circumference surface at a fixed angle corresponding to an apex angle of the prism, into light parallel to an optical axis of incident light. Then, the parallel return light is offset from the optical axis of incident light in accordance with a displacement of the object to be measured relative to the truncated cone shaped prism. For example, if the object to be measured is spaced apart from the truncated cone shaped prism, the parallel return light is offset in a direction moving away from the optical axis of the incident light, whereas if the object to be measured is spaced close to the truncated cone shaped prism, the parallel return light is offset by a smaller amount from the optical axis of the incident light. The amount of offset can be detected by a detection section, to thereby determine a displacement of the object to be measured.

Therefore, a displacement of an object to be measured can be determined with a high degree of precision by introducing light from the center of the truncated cone shaped prism to the object to be measured, receiving light reflected from the object on the truncated conical circumference surface, extracting only light parallel to the incident light from the reflected light by means of, for example, a pinhole optical device, and detecting the amount of offset of the parallel return light from the optical axis of the incident light. Further, because, in the measurement, a narrow beam of light is irradiated on the object to be measured through the center of the truncated cone shaped prism, i.e. the narrow-area flat portion perpendicular to the optical axis, influences of unevenness or other anomalies on a surface of the object to be measured can be prevented from affecting the measurement of the displacement. Further, because only the return light parallel to the incident light is used in the measurement, it is possible to prevent noise being introduced in the measurement of the displacement due to the unevenness or other anomalies on the surface of the object to be measured.

Figure 2:
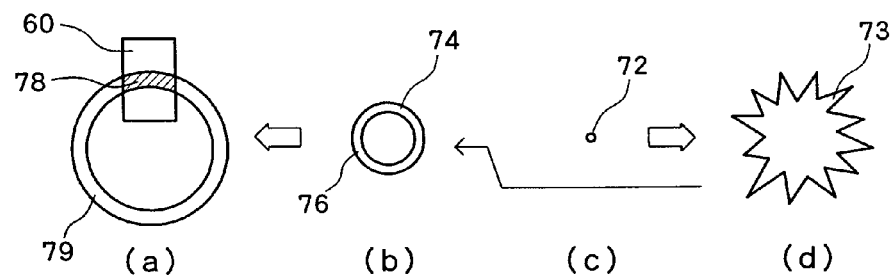
FIG. 2 shows shapes of light images at specific locations on an optical path of the optical displacement measuring apparatus according to the embodiment of the present invention.
Figure 3:
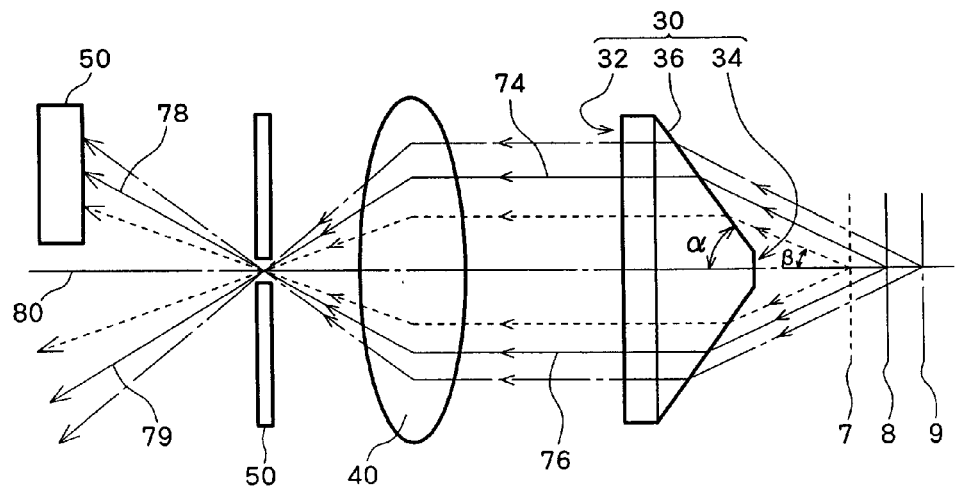
FIG. 3 is a diagram for explaining a situation where the optical paths are changed in accordance with displacements of an object to be measured in the embodiment according to the present invention.
Figure 4:
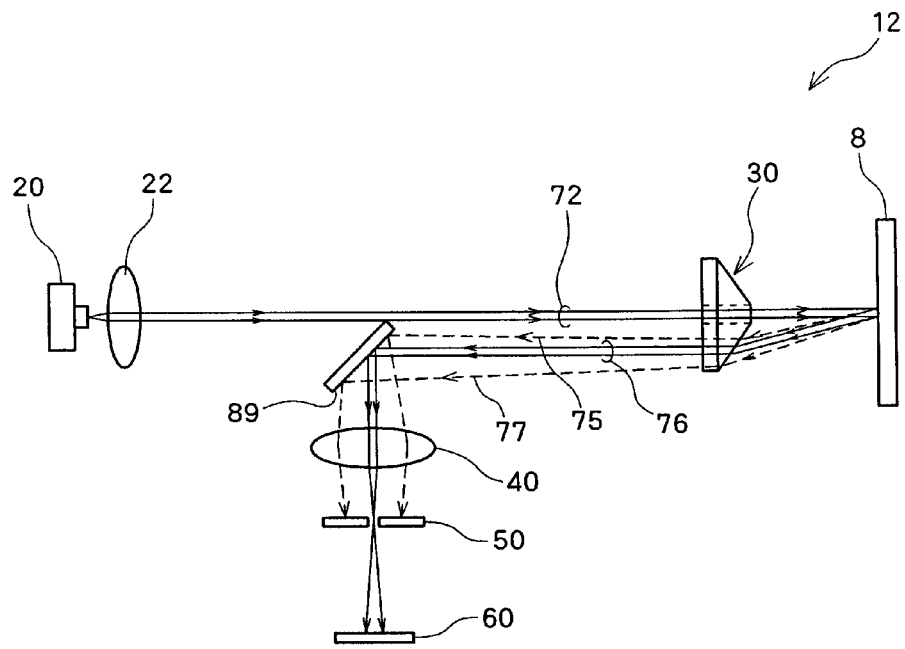
FIG. 4 is a diagram for explaining a configuration according to a second embodiment of the present invention.
Figure 5:
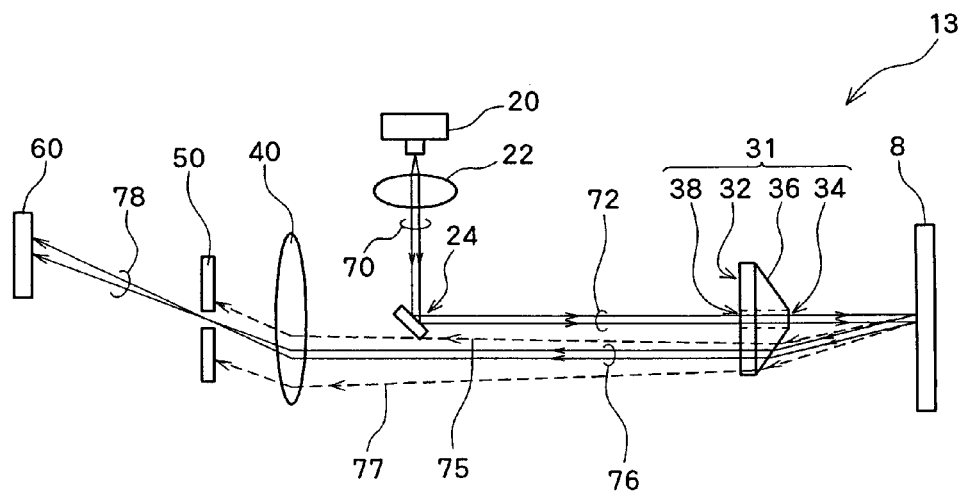
FIG. 5 is a diagram for explaining a configuration according to a third embodiment of the present invention.

FIG. 1 is a configuration diagram of the optical displacement measuring apparatus 10 in which the above-described measurement principle is embodied, FIG. 2 shows shapes of light images at specific locations on an optical path of the optical displacement measuring apparatus 10, and FIG. 3 is a diagram for explaining a situation that the optical paths are changed by displacements of the object to be measured.

The optical displacement measuring apparatus 10 includes, as an incident optical system, a light source 20, a collimate lens 22, and a mirror 24, and includes a truncated cone shaped prism 30 as an objective optical system. Further, the optical displacement measuring apparatus 10 includes an imaging lens 40 and a pinhole optical device 50 for extracting only a light beam parallel to the optical axis of the incident light from the light returned from the object to be measured 8 through the truncated cone shaped prism 30, and includes an optical position detecting sensor 60 as a detecting optical system.

The light source 20 is a laser light source for emitting laser light. The collimate lens 22 is an optical device having a function of collimating a light beam emitted from the light source 20, in other words, coaxially aligning the light beams with each other as parallel light. FIG. 1 shows parallel light 70 being the collimated beam. It is preferable that a beam diameter of the parallel light 70 is narrowed down to the maximum extent possible as long as an amount of light necessary for the measurement is obtained. The mirror 24 is a reflecting mirror which has a function of changing a direction of the optical axis of the parallel light 70 having been collimated by the collimate lens 22 in order to direct the parallel light 70 as incident light 72 toward the truncated cone shaped prism 30 being the objective optical system. The parallel light 70 is shaped by the mirror 24 into a narrow beam whose central axis coincides with an optical axis 80 of the objective optical system.

The truncated cone shaped prism 30 is an optical device constituting the objective optical system, which is opposed to the object to be measured 8. The truncated cone shaped prism 30 is a prism having a truncated cone shape and including a broad-area flat portion 32 and a narrow-area flat portion 34, each of whose flat surface is perpendicular to the optical axis 80, in addition to a truncated conical circumference surface 36 for connecting the broad-area flat portion 32 and the narrow-area flat portion 34. Further, the truncated cone shaped prism 30 is placed at a position where an apex angle side having the narrow-area flat portion 34 is opposed to the object to be measured 8, to thereby realize a function of introducing the incident light 72 from a broad-area flat portion 32 side via a narrow-area flat portion 34 side to the object to be measured 8, receiving light reflected from the object to be measured 8 on the truncated conical circumference surface 36, and directing the reflected light toward the optical position detecting sensor 60 which is the detection section.

An apex angle of the truncated conical circumference surface may be defined based on a distance from the object to be measured 8, a required displacement resolution, or other factors. For example, a greater apex angle is suitable for measurement performed in an environment where a distance from the object is long, while a smaller apex angle is suitable for enhancing the displacement resolution. A central axis of the truncated conical circumference surface is defined so as to coincide with the central axis of the broad-area flat portion 32 and the central axis of the narrow-area flat portion 34, in other words, match an optical central axis of the truncated cone shaped prism 30. The optical central axis of the truncated cone shaped prism 30 is established so as to match the optical axis 80 shown in FIG. 1. The truncated cone shaped prism 30 as described above may be obtained by processing or forming an optical material such as optical glass or optical plastic.

In FIG. 1, as a displacement measuring direction corresponds to a direction along the optical axis 80, the object to be measured 8 is illustrated in an arrangement perpendicular to the optical axis 80. The arrangement is only used for clarifying that a surface whose displacement is to be measured is orthogonal to the optical axis 80, and the object to be measured 8 may take any form. Whatever the form may be, the incident light 72 is introduced from the broad-area flat portion 32 side having the flat surface perpendicular to the optical axis 80 via the narrow-area flat portion 34 side also having the flat surface perpendicular to the optical axis 80 to the object to be measured 8. Thus, the incident light 72 is vertically incident upon the surface of the object to be measured 8. Although the incident light 72 is narrowed down as described above, the incident light 72 is defined so as to have a beam diameter smaller than a diameter of the narrow-area flat portion 34 because the incident light 72 is introduced through the narrow-area flat portion 34 to the object to be measured 8.

The imaging lens 40 is an optical device having a function of converging the light beam parallel to the optical axis 80 to a focus point on the optical axis 80, and a condenser lens, such as a convex lens, for example, may be used for the imaging lens 40. Accordingly, a converging axis of the imaging lens 40 is established so as to coincide with the optical axis 80.

The pinhole optical device 50 is a light shielding plate having a small pinhole, and placed vertically to the optical axis at a location corresponding to the focus point of the imaging lens 40. Further, the pinhole optical device 50 is placed in such a manner that the optical axis 80 passes exactly through the pinhole. The pinhole optical device 50 cooperates with the imaging lens 40 to realize a parallel light extracting function where light beams which are not parallel to the optical axis 80 are screened out from the reflected light returned through the truncated conical circumference surface of the truncated cone shaped prism 30 so as to allow only parallel light 74, 76 which is a component of light parallel with the optical axis 80 to pass through the pinhole.

In FIG. 1, light 75, 77 is shown as an example of return light which is a beam non-parallel to the optical axis 80 contained in the reflected light having been returned from the object to be measured 8 via the truncated conical circumference surface of the truncated cone shaped prism 30. In an imaging operation of the imaging lens 40, the light 75, 77 non-parallel to the optical axis 80 is focused on a point which differs from the focus point where the parallel light 74, 76 is focused to form an image. In the pinhole optical device 50, as described above, the optical axis 80 passes exactly through the pinhole, and the focus point where the parallel light 74, 76 is focused by the imaging lens 40 is established at the location of the pinhole. Thus, the light 75, 77 which is not parallel to the optical axis 80 and imaged by the imaging lens 40 is not allowed to pass through the pinhole in the pinhole optical device 50 and is blocked. Therefore, the light 75, 77 cannot travel to the other side of the pinhole where the optical position detecting sensor 60 is located. In this manner, the pinhole optical device 50 removes, as noise light, the return light non-parallel to the optical axis 80 from the reflected light which is returned from the object to be measured 8 through the truncated conical circumference surface of the truncated cone shaped prism 30.

The pinhole optical device 50 as described above may be configured by forming an appropriate through hole in a plate material capable of blocking light. The thickness of the plate material and the size of the pinhole may be defined based on the sensitivity or other properties of the optical position detecting sensor 60.

The optical position detecting sensor 60 cooperates with the imaging lens 40 and the pinhole optical device 50 to realize a function of detecting changes in an amount of offset of the parallel light 74, 76 from the optical axis 80. The optical position detecting sensor 60 is an optical device which is placed on the opposite side of the imaging lens 40 relative to the focus point of the imaging lens 40 and capable of detecting a location of a light spot or a light image. For the optical position detecting sensor 60, a commercially available sensor which is generally referred to as a Position Sensitive Detector (PSD) may be used. Alternatively, imaging devices such as two-dimensional array Charge Coupled Devices (CCDs) may be used. It is preferable that a detection plane of the optical position detecting sensor 60 is perpendicular to the optical axis 80. In this way, an amount of displacement of the object to be measured 8 can be detected as a travel distance on the detection plane.

FIG. 2 shows shapes of light images at specific locations on the optical path of the optical displacement measuring device 10 in the order corresponding to the placement of the components in FIG. 1. It should be noted that in the description below, components similar to those shown in FIG. 1 are designated by identical reference numerals to those in FIG. 1, and the detailed descriptions related to the components will not be repeated. Accordingly, the reference numerals depicted in FIG. 1 are also used in the description below. Now, the light images at the specific locations on the optical path of the optical displacement measuring apparatus 10 will be explained in the order in which light propagates. In FIG. 2, a segment (c) represents the incident light 72, a segment (d) represents reflected light 73 on the surface of the object to be measured 8, a segment (b) represents the parallel light 74, 76 which is the component of the reflected light 73 parallel to the optical axis 80, and a segment (a) represents light 78, 79 at the location of the optical position detecting sensor 60.

The incident light 72, which is the narrow beam narrowed down to a size smaller than the flat surface of the narrow-area flat portion 34 in the truncated cone shaped prism 30 as described above, is represented as a small-diameter beam at the segment (c) in FIG. 2.

The reflected light 73 is a beam obtained at the time when the incident light vertically irradiated on the surface of the object to be measured 8 is reflected. For example, if the surface of the object to be measured 8 is a mirror plane, the reflected light 73 would become a small-diameter beam similar to that shown at the segment (C) in FIG. 2. In practice, the surface of the object to be measured 8 is not a mirror plane, but has, for example, unevenness or steps. Accordingly, the broadly scattered beam propagating in all directions is obtained as shown at the segment (d) in FIG. 2.

The parallel light 74, 76 is a virtual representation of the component of light parallel to the optical axis 80 extracted from the reflected light 73. The parallel light 74, 76 is a component of light in the shape of a cylindrical column whose radius is equal to the offset amount defined based on a refractive index n, an apex angle $2\alpha$, and a distance d between the truncated cone shaped prism 30 and the object to be measured 8.

More specifically, among the components of the reflected light 73 from the surface of the object to be measured 8, a component of light in a shape being symmetric with respect to the optical axis 80 and having a fixed angle $2\beta$ is converted into the parallel light 74, 76 relative to the optical axis 80 when the component is returned to the truncated conical circumference surface of the truncated cone shaped prism 30 having the apex angle $2\alpha$ and the refractive index n. The fixed angle $2\beta$ can be readily obtained from the apex angle $2\alpha$ and the refractive index n. Then, a point at which the component of light that satisfies the condition of the fixed angle $2\beta$ intersects the truncated conical circumference surface of the truncated cone shaped prism 30 is changed in accordance of the distance d between the truncated cone shaped prism 30 and the object to be measured 8, i.e. a displacement amount of the object to be measured 8 in a direction along the optical axis 80. Therefore, the offset amount of the parallel light 74, 76 relative to the optical axis 80 is changed based on the displacement amount of the object to be measured 8 in the direction along the optical axis 80.

The above-described situation is shown in FIG. 3. It should be noted that the incident optical system of FIG. 1 is not illustrated in FIG. 3. In FIG. 3, the same components as those shown in FIGS. 1 and 2 are designated by the same reference numerals as those of FIGS. 1 and 2, and the detailed descriptions related to the components will not be repeated. Accordingly, the reference numerals shown in FIGS. 1 and 2 are also used in the description below.

In FIG. 3, the object to be measured 8 is taken as a reference position, and positions shifted forward and backward from the reference position are represented by objects to be measured 7 and 9. For example, a state of the object to be measured 8 displaced in a direction approaching near by the truncated cone shaped prism 30 along the optical axis 80 is shown as the object to be measured 7. In this state, a position where a light beam that satisfies the condition of the angle $2\beta$ on the surface of the object to be measured 7 intersects the truncated conical circumference surface 36 of the truncated cone shaped prism 30 is closer to the optical axis 80 than a position where a light beam that satisfies the condition of the angle $2\beta$ on the object to be measured 8 intersects the conical circumference surface 36 of the truncated cone shaped prism 30. Accordingly, when the light that satisfies the condition of the angle $2\beta$ on the surface of the object to be measured 7 is refracted by the truncated conical circumference surface 36 having the apex angle $2\alpha$ in the truncated cone shaped prism 30 having the refractive index n, and converted into a light beam parallel with the optical axis 80, an offset amount of the parallel light beam from the optical axis 80 is smaller than the offset amount of the parallel light 74, 76 from the optical axis 80 obtained in a case of the object to be measured 8.

Similarly, in FIG. 3, a state of the object to be measured 8 displaced in a direction moving away from the truncated cone shaped prism 30 along the optical axis 80 is shown as the object to be measured 9. In this state, a position where light that satisfies the condition of the above-described angle $2\beta$ on the surface of the object to be measured 9 intersects the truncated conical circumference surface 36 of the truncated cone shaped prism 30 is farther from the optical axis 80 than the position where light that satisfies the condition of the angle $2\beta$ on the object to be measured 8 intersects the conical circumference surface 36 of the truncated cone shaped prism 30. Accordingly, when the light that satisfies the condition of the angle $2\beta$ on the surface of the object to be measured 9 is refracted by the truncated conical circumference surface 36 having the apex angle $2\alpha$ in the truncated cone shaped prism 30 having the refractive index n, and converted into a light beam parallel with the optical axis 80, an offset amount of the parallel light beam from the optical axis 80 is greater than the offset amount of the parallel light 74, 76 from the optical axis 80 obtained in the case of the object to be measured 8.

As described above, the use of the optical properties of the truncated cone shaped prism 30 brings about an effect that, among the light introduced from the center of the truncated cone shaped prism 30 to the object to be measured 8 and scattered on the surface of the object to be measured 8, the parallel light 74, 76 collimated by the truncated conical circumference surface 36 of the truncated cone shaped prism 30 is offset from the optical axis 80, and an amount of the offset differs depending on the displacement amount of the object to be measured 8 in the direction along the optical axis 80.

Returning back to FIG. 2, light 78, 79 at the location of the optical position detecting sensor 60 shown at the segment (a) in FIG. 2 is a beam obtained when the above-described parallel light 74, 76 having been focused by the imaging lens 40 is diffused again as conical light. Specifically, the light 78, 79, which is the conical light formed on a plane perpendicular to the optical axis 80 at the location of the optical position detecting sensor 60, is a doughnut-shaped light corresponding to the bottom of the conical light as shown at the segment (a) in FIG. 2. The optical position detecting sensor 60 is disposed over a range that covers positional changes of the conical light. At the segment (a) in FIG. 2, a portion of the doughnut-shaped light being the conical light is illustrated as the light 78. The other portions of the doughnut-shaped light are not detected by the optical position detecting sensor 60 and are dissipated into space.

Now, a relationship between the displacement of the object to be measured 8 and a position of an image of light on the optical position detecting sensor 60 will be described. Referring back to FIG. 3, the parallel light 74, 76 obtained from the object to be measured 8 at the reference position is focused by the imaging lens 40, and following the focusing, re-shaped into conical light 78, 79 which travels toward the optical position detecting sensor 60.

Here, regarding parallel light obtained from the object to be measured 7 displaced in the direction approaching near by the truncated cone shaped prism 30 from the reference position, the offset amount of the parallel light from the optical axis 80 is, as described above, smaller than the offset amount of the parallel light 74, 76 obtained from the object to be measured 8 at the reference position. Therefore, an apex angle of the conical light obtained when the parallel light from the object to be measured 7 is diffused again subsequent to the focusing by the imaging lens 40 is smaller than the apex angle of the conical light 78, 79 obtained in the case of the reference position. Accordingly, the conical light obtained from the object to be measured 7 is imaged on the optical position detecting sensor 60 at a position closer to the optical axis 80.

On the other hand, regarding parallel light obtained from the object to be measured 9 displaced from the reference position in the direction moving away from the truncated cone shaped prism 30, the offset amount of the parallel light relative to the optical axis 80 is, as described above, greater than the offset amount of the parallel light 74, 76 obtained from the object to be measured 8 at the reference position. Therefore, in this case, the apex angle of the conical light obtained when the parallel light from the object to be measured 9 is diffused again subsequent to the focusing by the imaging lens 40 is greater than the apex angle of the conical light 78, 79 obtained in the case of the reference position. Accordingly, the conical light obtained from the object to be measured 9 is imaged on the optical position detecting sensor 60 at a position farther away from the optical axis 80.

While using the optical properties of the truncated cone shaped prism 30 as described above, the offset amount of the parallel light from the optical axis 80 which differs depending on the displacement amount of the object to be measured 8 is converted by means of the imaging lens 40 and the pinhole optical device 50 into the amount of change in position of light imaged on the optical position detecting sensor 60 relative to the optical axis 80. In this way, the displacement of the object to be measured 8 can be measured in the optical position detecting sensor 60.

Referring to FIGS. 4 to 12, some modifications will be exemplified below. In the description below, the same components as those shown in FIGS. 1 to 3 are designated by the same reference numerals as those of FIGS. 1 to 3, and the detailed descriptions related to the components will not be repeated. Accordingly, the reference numerals of FIGS. 1 to 3 are also used in the description below.

Embodiment 2

In the above description, the incident optical system is configured to change the direction of light by means of the mirror 24 for introducing the narrow beam of incident light 72 to the object to be measured 8. An optical displacement measuring apparatus 12 shown in FIG. 4 has the configuration in which a narrow beam of light emitted from the light source 20 and collimated by the collimate lens 22 is directly introduced as the incident light 72 into the truncated cone shaped prism 30 without using the mirror. In this case, the light reflected from the object to be measured 8 and returned through the truncated cone shaped prism 30 is redirected in such a manner that an optical path of the light is changed by the mirror 89 into a direction toward the imaging lens 40, the pinhole optical device 50, and the optical position detecting sensor 60.

In the configuration as described above, because the light source 20 which also works as a heat source can be placed away from the object to be measured 8, an adverse effect, such as deformation of the object to be measured 8, caused by heat liberated from the laser light source or the like can be suppressed.

Embodiment 3

It has been described above that the incident light 72 passes through a material of the truncated cone shaped prism such as, for example, an optical glass material. Here, an optical displacement measuring apparatus 13 shown in FIG. 5 will be described as an example of using a hollow truncated cone shaped prism 31 in which through hole 38 is formed by cutting out an area where the incident light 72 passes through. The through hole 38 is formed so as to have a diameter greater than the diameter of the incident light 72 and smaller than or equal to the diameter of the narrow-area flat portion 34.

When the configuration as described above is adopted, both a loss of the incident light 72 and reflection of the incident light 72 inside the truncated cone shaped prism 31 can be suppressed.

Embodiment 4

Figure 6:
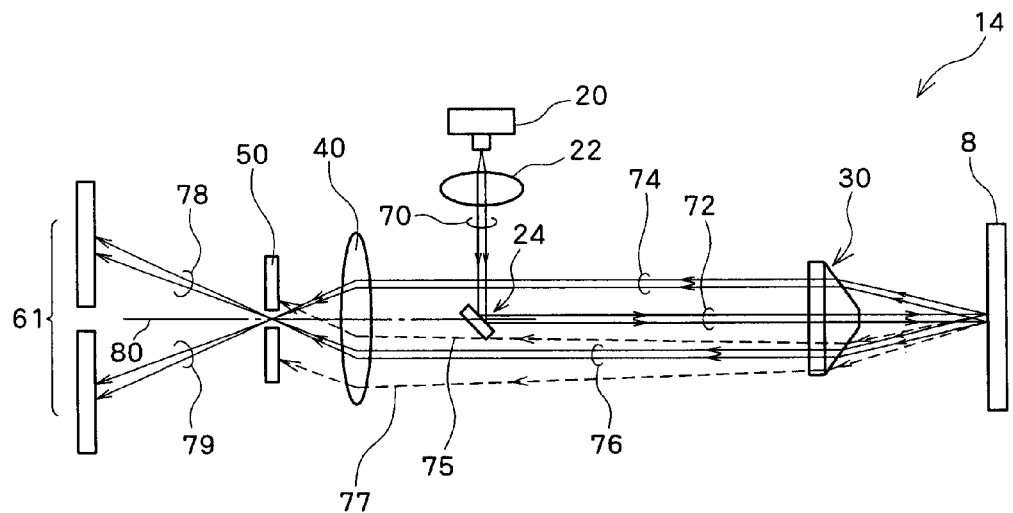
FIG. 6 is a diagram for explaining a configuration according to a fourth embodiment of the present invention.

Although it has been described above that a part of the conical light delivered from the pinhole of the pinhole optical device 50 is received on the optical position detecting sensor, an optical displacement measuring apparatus 14 shown in FIG. 6 includes an optical position detecting sensor 61 for receiving all of the conical light 78, 79 delivered from the pinhole optical device 50. In some instances, instead of receiving all of the conical light 78, 79, the conical light 78, 79 may be partially received on both of an upper side and a lower side respects to the optical axis 80. In other words, the optical position detecting sensor 61 may be composed of two separate portions.

According to the above-described configuration, even when the quantity of conical light is in part reduced due to local irregularities in the reflection from the object to be measured 8, the displacement of the object to be measured 8 can be determined with a high degree of precision by conducting the measurement in a region where there is a sufficient quantity of light.

Embodiment 5

Figure 7:
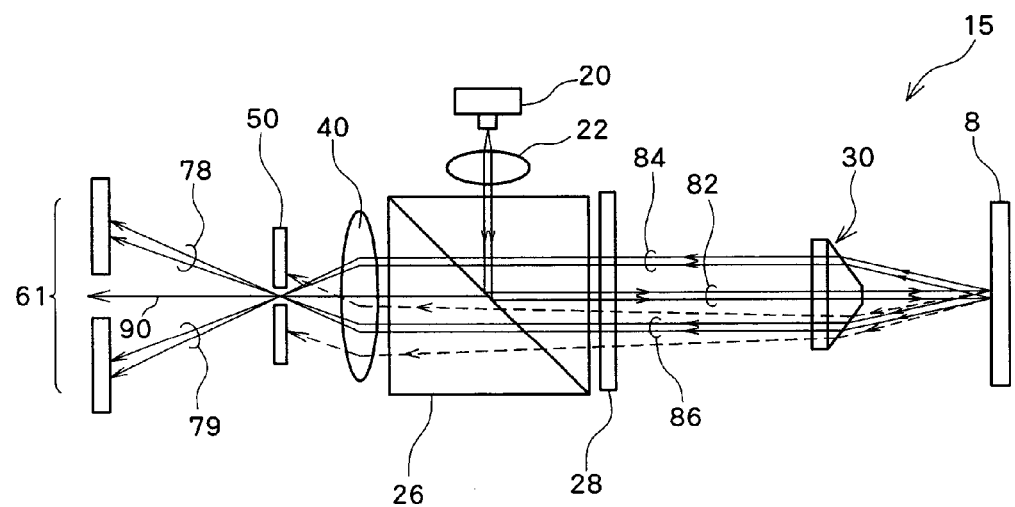
FIG. 7 is a diagram for explaining a configuration according to a fifth embodiment of the present invention.

An optical displacement measuring apparatus 15 shown in FIG. 7 has a configuration in which, instead of using the mirror for the incident optical system, a polarization beam splitter 26 and a quarter-wave plate 28 are installed in place of the mirror.

The polarization beam splitter 26 is an optical component having a function of accepting parallel light from the light source 20 having been collimated through the collimate lens 22 and changing a direction of an S polarized component of the collimated light by 90 degrees to advance the S polarized component of light as a light toward the object to be measured 8, i.e. toward the truncated cone shaped prism 30. The polarization beam splitter 27 may be composed, as shown in FIG. 7, of two rectangular prisms between which a semipermeable film is inserted. In this case, the inclination of the semipermeable film is set to 45 degrees relative to a direction along the optical axis of the incident light 82.

The quarter-wave plate 28 is an optical device in which an S polarized component of light received therein is converted into circularly polarized light while the circularly polarized light received therein is converted into the P polarized component of light whose phases differ by 90 degrees from those of the S polarized component of light. The quarter-wave plate 28 as described above may be configured by a film composed of a well-known birefringent material or the like disposed at a predetermined angle of optical axis inclination relative to the direction along an optical axis of the incident light 82.

In FIG. 7, similarly to FIG. 1, the central optical axis of the truncated cone shaped prism 30 is disposed so as to coincide with a light converging axis of the imaging lens 40, while a central optical axis of the polarization beam splitter 26 is disposed so as to coincide with the central optical axis of the truncated cone shaped prism 30.

Functions of the optical displacement measuring apparatus 15 with the above-described configuration will be explained below. Laser light from the light source 20 is shaped into a parallel light beam by the collimate lens 22, and supplied to the polarization beam splitter 26 at an angle of 90 degrees relative to the central optical axis of the truncated cone shaped prism 30. The supplied light beam is bent by 90 degrees in the polarization beam splitter 26 and converted through the quarter-wave plate 28 into circularly polarized light which is delivered as the incident light 82. The incident light 82 is introduced through the narrow-area flat portion of the truncated cone shaped prism 30 to the object to be measured 8 from which the incident light 82 is reflected, and subsequently bent by the truncated conical circumference surface of the truncated cone shaped prism 30. FIG. 7 shows parallel light 84, 86 which is a component of light parallel to the incident light 82.

The parallel light 84, 86 and others returned from the truncated cone shaped prism 30 is converted from the circularly polarized light into P polarized light by the quarter-wave plate 28, and passes through the polarization beam splitter 26 while traveling in a straight line along the central optical axis toward the imaging lens 40.

In order to prevent zero-order reflected light 90 from affecting a detection result in the optical position detecting sensor 61, the optical position detecting sensor 61 has a configuration for bypassing an optical route of the zero-order reflected light 90. For example, the optical position detecting sensor 61 may be formed in a hollow shape with a through hole drilled in a central region of the optical position detecting sensor 61, thereby allowing the zero-order reflected light 90 to bypass the optical position detecting sensor 61. It is also possible to divide the optical position detecting sensor 61 into two separate portions so as to allow the zero-order reflected light 90 to pass therebetween. Alternatively, the optical position detecting sensor 61 may be formed as the configuration for detecting a part of the conical light as depicted in FIG. 1, to thereby avoid interaction between the zero-order reflected light 90 and the optical position detecting sensor 61.

As described above, the polarization beam splitter 26 and the quarter-wave plate 28 have a function, as the incident optical system, of changing the direction of the optical axis of light received from the collimate lens 22 to a direction toward the truncated cone shaped prism 30, in addition to a function of directing the return light having passed through the truncated cone shaped prism 30 to the imaging lens 40.

According to the above-described configuration, because the polarization beam splitter 26 and the quarter-wave plate 28 are installed in the incident optical system without using the mirror, its possible to avoid that the return light interfering with the mirror when the object to be measured 8 is located close to the objective optical system.

Embodiment 6

Figure 8:
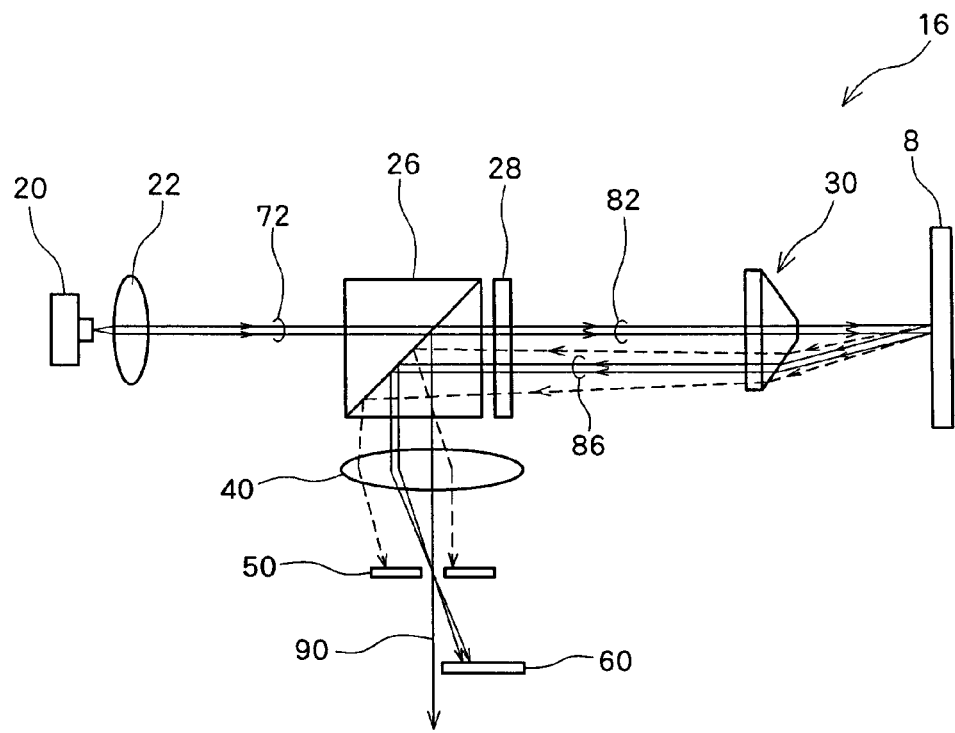
FIG. 8 is a diagram for explaining a configuration according to a sixth embodiment of the present invention.

An optical displacement measuring apparatus 16 shown in FIG. 8 is presented as an example of using the polarization beam splitter 26 and the quarter-wave plate 28 described with reference to FIG. 7 in a configuration in which an optical axis of the incident light 72 delivered through the collimate lens 22 from the light source 20 is aligned with the central optical axis of the truncated cone shaped prism 30.

In the configuration, the light source 20 also functioning as a heat source can be placed away from the object to be measured 8, to thereby prevent the occurrence of adverse effects, such as deformation of the object to be measured 8, caused by heat liberated from the laser light source or the like. In addition, because no mirror is used, return light is protected against interference with a mirror.

Embodiment 7

Figure 9:
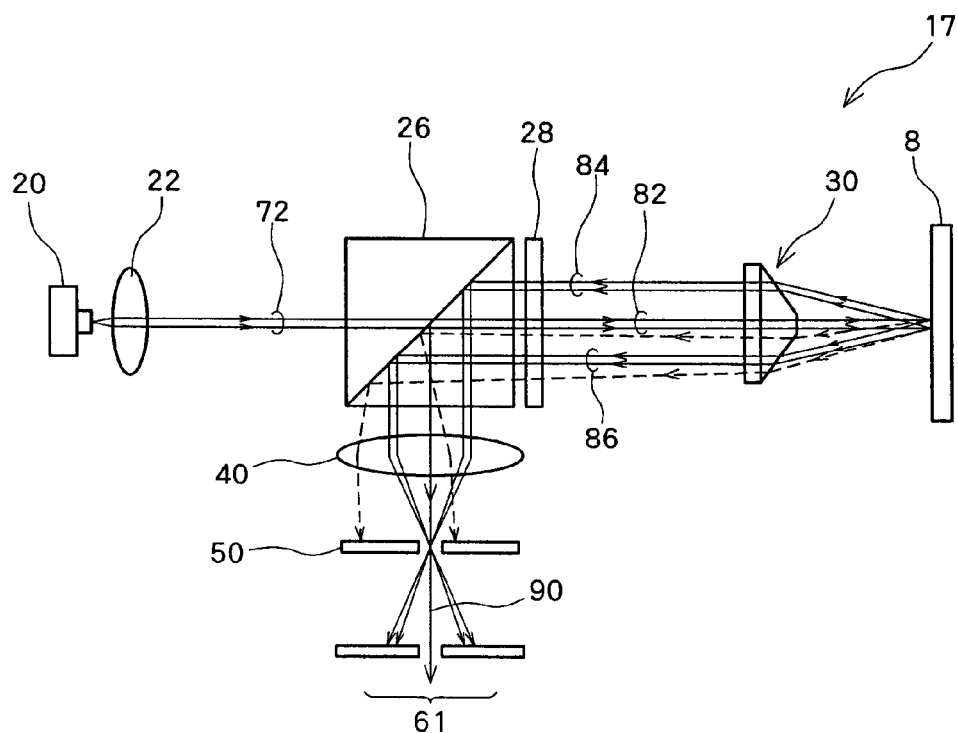
FIG. 9 is a diagram for explaining a configuration according to a seventh embodiment of the present invention.

An optical displacement measuring apparatus 17 shown in FIG. 9 is presented as an example of a configuration for improving the optical position detecting sensor 60 shown in FIG. 8 which is placed only on one side of the zero-order reflected light 90. In other words, an optical position detecting sensor 61 for receiving conical detection-subject light over a wide range is utilized. More specifically, the optical position detecting sensor 61 may be formed, similarly to that depicted in FIG. 6, in a hollow shape in which a through hole is drilled in a central area of the optical position detecting sensor 61 to thereby allow the zero-order reflected light to pass through the through hole. Alternatively, the optical position detecting sensor 61 may be divided into two separate sections, thereby allowing the zero-order reflected light 90 to pass through space between the two separate sections.

In the configuration as described above, the light source 20 also functioning as a heat source can be placed away from the object to be measured 8, to thereby prevent the occurrence of adverse effects, such as deformation of the object to be measured 8, caused by heat liberated from the laser light source or the like. Further, because no mirror is used, return light is protected against interference with a mirror. Still further, even when the quantity of conical light is in part reduced due to local irregularities in the reflection from the object to be measured 8, the displacement of the object to be measured 8 can be determined with a high degree of precision by conducting the measurement in a region where there is a sufficient quantity of light.

Embodiment 8

Figure 10:
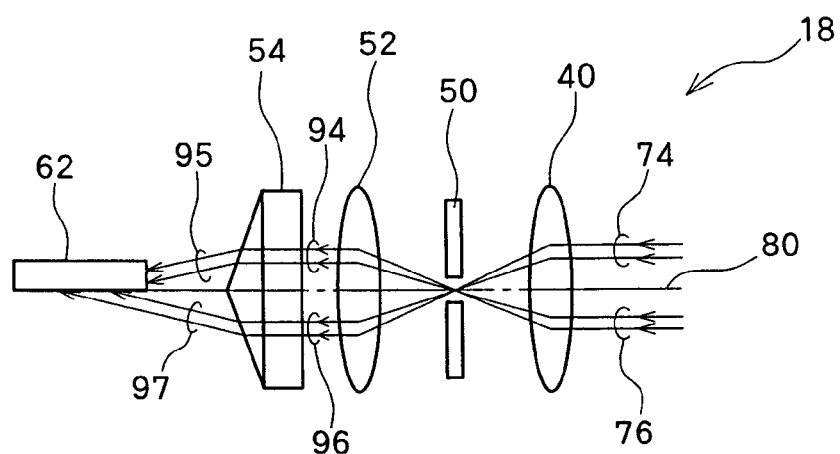
FIG. 10 is a diagram for explaining a configuration according to an eighth embodiment of the present invention.

A detector plane of the optical position detecting sensor has been described above as being perpendicular to the optical axis 80. On the other hand, an optical displacement measuring apparatus 18 shown in FIG. 10 is presented as an example of a configuration in which the detector plane of an optical position detecting sensor 62 is placed parallel to the optical axis 80. It should be noted that only components related to the optical path located downstream from the imaging lens 40 are illustrated in FIG. 10. The optical displacement measuring apparatus 18 includes, as the detecting optical system, a restoration lens 52 for re-shaping the detection-subject light after passing through the pinhole optical device 50 into parallel light 94 and 96 having a cylindrical column shape parallel to the optical axis 80, and a truncated cone shaped prism 54 which is an optical device formed in a truncated cone shape and disposed at a position where an apex angle side is opposed to the optical position detecting sensor 62, to thereby again converge the parallel light 94 and 96 in the cylindrical column shape parallel to the optical axis 80 having been restored by the restoration lens 52.

Figure 11:
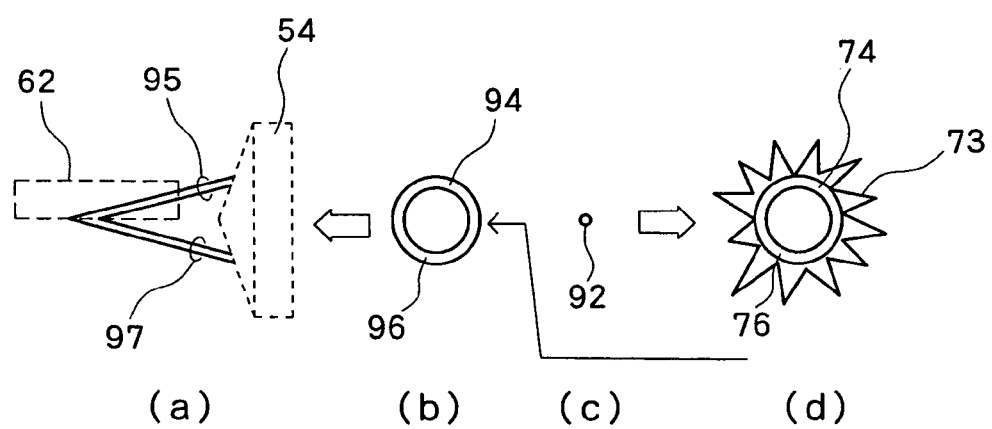
FIG. 11 shows shapes of light images at specific locations on an optical path of the optical displacement measuring apparatus having the configuration shown in FIG. 10.

Referring to FIG. 11, functions of the above-described configuration will be described below. FIG. 11 shows shapes of light images at specific locations on the optical path of the optical displacement measuring apparatus 18 in the order corresponding to the placement of the components in FIG. 10. The reference numerals indicated in FIG. 10 are also used in the description below. The light images at the specific locations on the optical path of the optical displacement measuring apparatus 18 will now be explained in the order in which light propagates. In FIG. 11, a segment (d) represents reflected light 73 on the surface of the object to be measured 8 together with the parallel light 74, 76 being a parallel component of light parallel to the optical axis 80, a segment (c) represents light 92 imaged at the focus point of the pinhole optical device 50, a segment (b) represents the parallel light 94, 96 converted from the conical light having passed through the pinhole optical device 50 into the parallel light relative to the optical axis 80 by the restoration lens 52, and a segment (a) represents conical light 95, 97 which is again converged from the parallel light 94, 96 by the truncated cone shaped prism 54.

The conical light 95, 97 converged by the truncated cone shaped prism 54 have an apex on an optical position detecting sensor 62 side and a central axis parallel to the optical axis 80. Therefore, the entire light quantity of the conical light 95, 97 is concentrated on the apex. Then, the detector plane of the optical position detecting sensor 62 is disposed parallel to the optical axis 80 in such a manner that the apex of the conical light 95, 97 is positioned exactly on the detector plane of the optical position detecting sensor 62. According to this configuration, the optical position detecting sensor 62 is able to receive approximately one-half of the entire light quantity of the parallel light 74, 76 being the component parallel to the optical axis 80 contained in the return light from the object to be measured 8. In this configuration, it is possible to improve detection sensitivity, or reduce the power of incident light.

Embodiment 9

Figure 12:
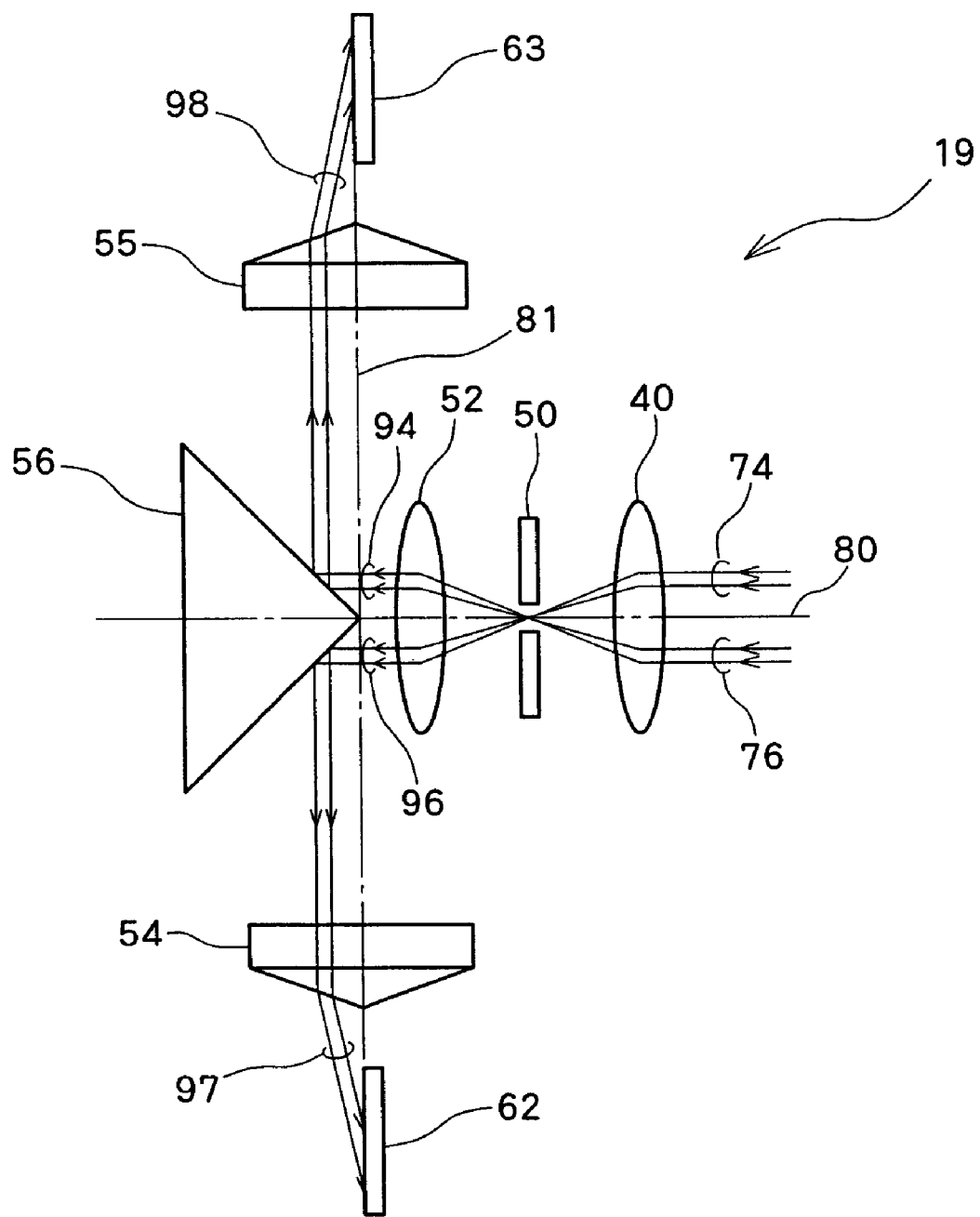
FIG. 12 is a diagram for explaining a configuration according to a ninth embodiment of the present invention.

An optical displacement measuring apparatus 19 shown in FIG. 12 has a configuration in which two optical position detecting sensors 62 and 63 are installed rather than the single optical position detecting sensor 62 in the optical displacement measuring apparatus described in FIG. 10 which is installed to receive approximately one-half of the light quantity of the conical light 95, 97. With the provision of the two optical position detecting sensors 62 and 63, a triangular prism 56 is installed after the restoration lens 52 to divide the parallel light 94, 96 having the cylindrical column shape collimated by the restoration lens 52 into two parts which are respectively directed to the truncated cone shaped prisms 54 and 55. The truncated cone shaped prisms 54 and 55 respectively converge the parallel light into conical light in such a manner that an apex of the conical light is positioned on each detector plane of the optical position detecting sensors 62 and 63 in a manner similar to that described referring to FIGS. 10 and 11.

Accordingly, the common optical axis 80 shared by the imaging lens 40, the pinhole optical device 50 and the restoration lens 52 is established so as to orthogonally intersect a central optical axis 81 of the two truncated cone shaped prisms 54 and 55 exactly at the apex of the triangular prism 56. The triangular prism 56 is placed at a position where each reflection plane of the triangular prism 56 has an equal angle both from the optical axis 80 and from the central optical axis 81. In other words, the parallel light restored by the restoration lens 52 is bent by 90 degrees and reflected to opposite directions by the triangular prism 56, and respectively advanced to the truncated cone shaped prisms 54 and 55.

According to the above-described configuration, even when the quantity of conical light is in part reduced due to, for example, local irregularities in the reflection from the object to be measured 8, the displacement of the object to be measured 8 can be determined with a high degree of precision from a measurement obtained by one of the two optical position detecting sensors 62 or 63 which has received a greater quantity of light.

Embodiment 10

It has been described above that the truncated cone shaped prism is used as the objective optical system. The truncated cone shaped prism has an axially symmetric shape with respect to the optical axis. However, the truncated cone shaped prism may have a one-sided shape with respect to the optical axis, and the one-sided shape can yield almost the same effects in measurement of the displacement of object to be measured.

Figure 13:
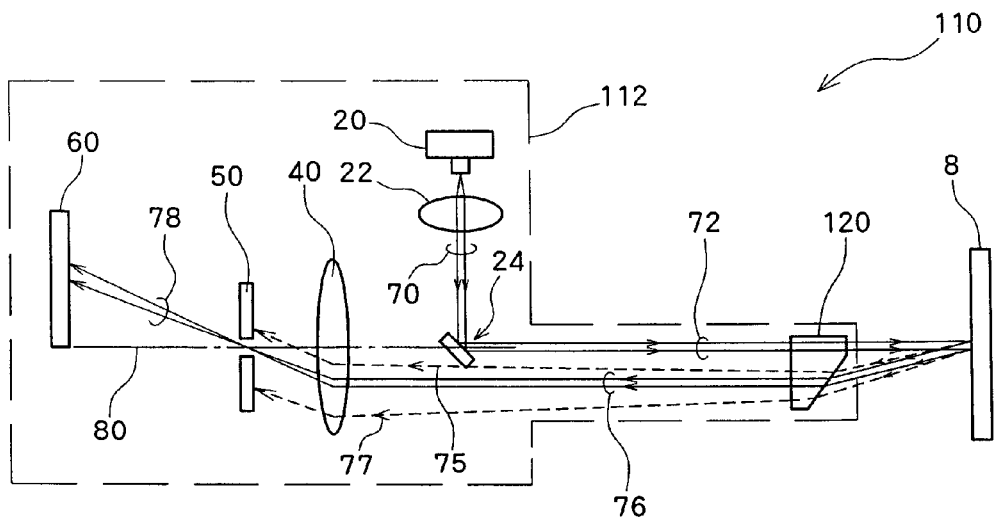
FIG. 13 is a diagram for explaining a configuration according to a tenth embodiment of the present invention.

FIG. 13 shows a configuration of an optical displacement measuring apparatus 110 in which a truncated semi-cone shaped prism which is formed in a shape corresponding to substantially half the truncated cone shaped prism is used as the objective optical system. The same components as those shown in FIGS. 1 to 12 are designated by the same reference numerals as those of FIGS. 1 to 12, and the descriptions related to the components will not be repeated. Accordingly, the reference numerals used in FIGS. 1 to 12 are also used in the description below.

Figure 14:
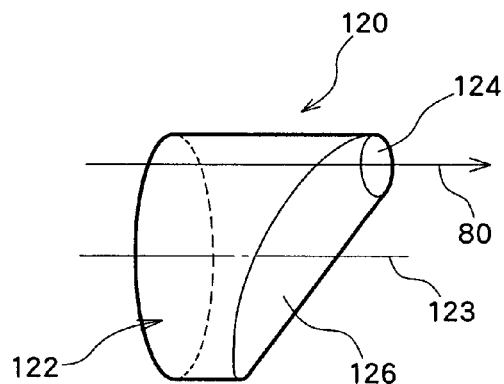
FIG. 14 is a detailed view of a truncated semi-cone shaped prism shown in FIG. 13.

The optical displacement measuring apparatus 110 shown in FIG. 13 includes the truncated semi-cone shaped prism 120 formed in a shape corresponding to substantially half the truncated cone shaped prism. Except as described, the configuration is identical to that of the optical displacement measuring apparatus 10 described with reference to FIG. 1. FIG. 14 is a detailed view of the truncated semi-cone shaped prism 120. The truncated semi-cone shaped prism 120 is formed in the shape of a cylindrical column by trimming a truncated cone shaped prism which includes a broad-area flat portion 122 and a narrow-area flat portion 124, each of whose flat surface is perpendicular to the optical axis 80, as well as a truncated conical circumference surface 126 for connecting the broad-area flat portion 122 and the narrow-area flat portion 124.

Here, although a central axis of the narrow-area flat portion 124 in the truncated semi-cone shaped prism 120 is coincident with the optical axis 80, a central axis 123 of the broad-area flat portion 122 in the cylindrical column is shifted from the optical axis 80. The truncated conical circumference surface 126 is a part of a complete truncated conical circumference surface for a truncated cone taking the optical axis 80 as a central axis. Further, a narrow-area flat portion 124 side is opposed to the object to be measured 8, to thereby introduce light from a broad-area flat portion 122 side via the narrow-area flat potion 124 side to the object to be measured 8. Then, light reflected from the object to be measured 8 is received on the truncated conical circumference surface 126 and directed toward the optical position detecting sensor 60 passing through the truncated semi-cone shaped prism 120.

In the above-described configuration, a narrow beam whose cross-sectional area is smaller than an area of the flat surface in the narrow-area flat portion 124 is vertically incident upon the object to be measured 8, which is similar to the instance of the truncated cone shaped prism depicted in FIG. 1. Accordingly, it is possible to prevent the position struck by the incident light varying depending on a displacement of the object to be measured 8, which can lead to displacement measurement with a high degree of precision.

In addition, because the optical axis 80 of incident light irradiated on the object to be measured 8 is shifted from the central axis 123 of the cylindrical column as described above, the truncated semi-cone shaped prism 120 can provide an angle between the incident light 72 and the parallel light 76 being detection-subject light greater than that provided by the truncated cone shaped prism 30 illustrated in FIG. 1 as long as the truncated semi-cone shaped prism 120 is similar in size to the truncated cone shaped prism 30. Compared with the case using the truncated cone shaped prism 30, the displacement resolution can be further improved. With the above-described configuration, downsizing of the optical displacement measuring apparatus 110 can be realized. A contour of a casing 112 for the optical displacement measuring apparatus 110 is shown in FIG. 13. Because the objective optical system can be made particularly narrow, the size of the optical displacement measuring apparatus 110 can be minimized.

Embodiment 11

Figure 15:
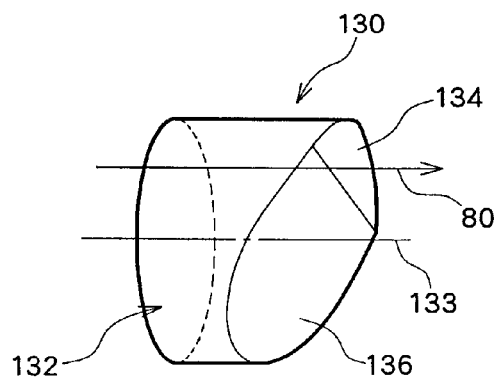
FIG. 15 is a diagram for explaining a configuration according to an eleventh embodiment of the present invention.

Although the optical displacement measuring apparatus 110 using the truncated semi-cone shaped prism 120 has been described referring to FIG. 13, a frustum-cylinder shaped prism 130 shown in FIG. 15 may be used in place of the truncated semi-cone shaped prism 120. The same components as those shown in FIGS. 1 to 14 are designated by the same reference numerals as those of FIGS. 1 to 14, and the descriptions related to the components will not be repeated. Accordingly, the reference numerals used in FIGS. 1 to 14 are also used in the description below.

The frustum-cylinder shaped prism 130 has a configuration including a broad-area flat portion 132 and a narrow-area flat portion 134, each of whose flat surface is perpendicular to the optical axis 80, and an inclined surface 136 for connecting the broad-area flat portion 132 and the narrow-area flat portion 134. Here, a central axis of the narrow-area flat portion 134 coincides with the optical axis 80. On the other hand, a central axis 133 of the broad-area flat portion 122 forming a cylinder column is shifted from the optical axis 80. Then, the narrow-area flat portion 134 is opposed to the object to be measured 8, to thereby introduce light from a broad-area flat portion 132 side through a narrow-area flat portion 134 side to the object to be measured 8, receive light reflected from the object to be measured 8 on the inclined surface 136, and direct light having passed through the frustum-cylinder shaped prism 130 toward the optical position detecting sensor 60.

The above-described configuration can also provide effects similar to those described with reference to FIGS. 13 and 14. Specifically, because it is possible to prevent the position struck by incident light varying depending on the displacement of the object to be measured 8, displacement measurement can be conducted with a high degree of precision. In addition, a wider angle can be established between incident light and detection-subject light. Compared with the case using the truncated cone shaped prism 30, the displacement resolution is improved. Thus, the downsizing of the optical displacement measuring apparatus can be realized.

Embodiment 12

In the instances shown in FIGS. 13 and 14, wider space can be established between the incident light and the detection-subject light, and incident light is irradiated upon the object to be measured 8 via the narrow-area flat portion of the objective optical system. However, as has already been described with reference to FIG. 5, there is no need for incident light to pass through the material of the objective optical system. Instead, optical loss can be suppressed by directing the incident light so as not to pass through the objective optical system. It should be noted that in the description below, the same components as those shown in FIGS. 1 to 15 are designated by the same reference numerals as those of FIGS. 1 to 15, and detailed descriptions related to the components will not be provided. Accordingly, the reference numerals in FIGS. 1 to 15 are also used in the description below.

Figure 16:
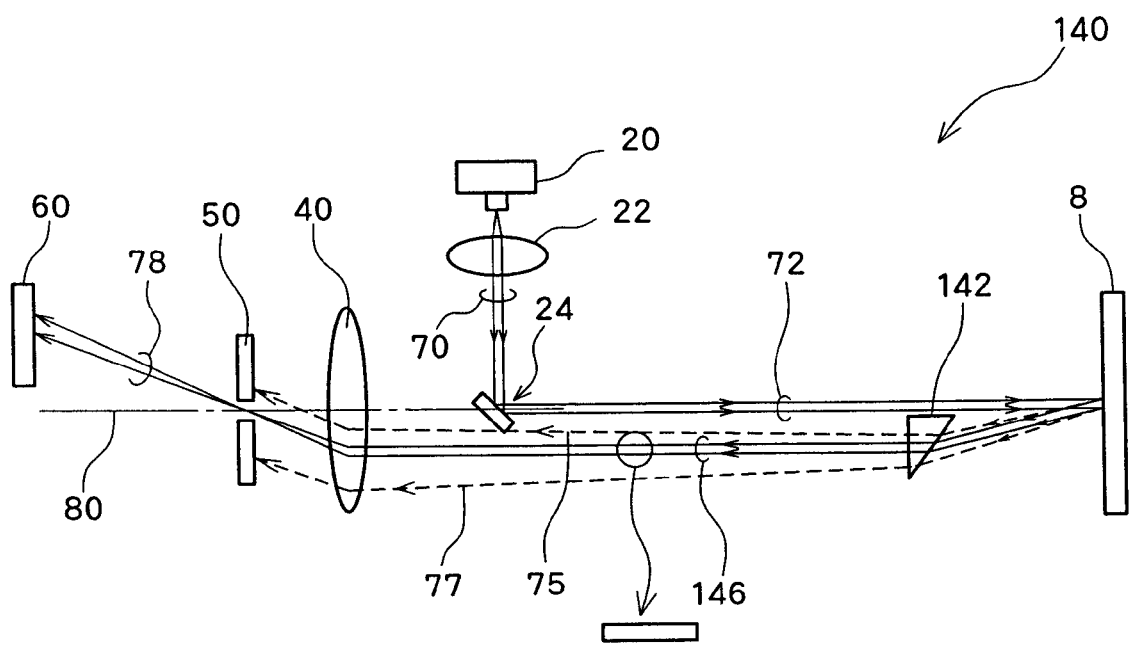
FIG. 16 is a diagram for explaining a configuration according to a twelfth embodiment of the present invention.

FIG. 16 shows a configuration of an optical displacement measuring apparatus 140 in which a triangular prism 142 is used as the objective optical system. In this configuration, the triangular prism 142 includes a flat surface perpendicular to the optical axis 80 along which light is introduced to the object to be measured 8, and an oblique surface which is inclined relative to the flat surface. Then, an oblique surface side of the triangular prism 142 is opposed to the object to be measured 8, for allowing the incident light 72 to be incident upon the object to be measured 8 without passing through the triangular prism 142. Then, reflected light from the object to be measured 8 is received on the oblique surface, and light 146 having passed through the triangular prism 142 is directed toward the optical position detecting sensor 60. Here, a cross-sectional shape of a beam of light parallel to the optical axis 80 is rectangle as shown in an enlarged view indicated by a circle in FIG. 16.

The above-described configuration can also yield the effects similar to those explained with reference to FIGS. 13 to 15. Specifically, variations of the position struck by incident light that occur depending on the displacement of the object to be measured 8 can be suppressed, to thereby realize high-precision displacement measurement. Further, it becomes possible to establish a wider angle between the incident light and the detection-subject light. Therefore, the displacement resolution is improved further compared to the case using the truncated cone shaped prism 30. In this way, the downsizing of the optical displacement measuring apparatus can be realized. Further, because the incident light does not pass through the objective optical system, the losses of incident light can be suppressed.

What is claimed is:

1. An optical displacement measuring apparatus, comprising an objective optical system and a detection section, for introducing light from a light source through the objective optical system to an object to be measured, and detecting light reflected from the object to be measured in the detection section to measure a displacement of the object to be measured relative to the objective optical system, wherein;

the objective optical system is an optical prism which includes a broad-area flat portion and a narrow-area flat portion, each of whose flat surface is perpendicular to an optical axis, and includes a connection surface for connecting the broad-area flat portion and the narrow-area flat portion; the optical prism being placed at a position where an apex angle side having the narrow-area flat portion is opposed to the object to be measured, to thereby introduce the light from a broad-area flat portion side through a narrow-area flat portion side to the object to be measured, receive light reflected from the object to be measured on the connection surface, and direct the reflected light toward the detection section.

2. The optical displacement measuring apparatus according to claim 1, wherein
the optical prism is a truncated cone shaped prism which includes the broad-area flat portion and the narrow-area flat portion, each of whose flat surface is perpendicular to the optical axis, and includes a truncated conical circumference surface as the connection surface for connecting the broad-area flat portion and the narrow-area flat portion.

3. The optical displacement measuring apparatus according to claim 2, wherein:
the truncated cone shaped prism has, in a central area thereof, a through hole for allowing the light from the light source to pass therethrough.

4. The optical displacement measuring apparatus according to claim 3, further comprising:
an incident optical system which has
a polarization beam splitter for changing a direction of the optical axis of the light from the light source to direct the light toward the objective optical system, and
a quarter-wave plate.

5. The optical displacement measuring apparatus according to claim 3, further comprising:
an imaging lens installed between the objective optical system and the detection section, and
a pinhole optical device disposed at a focus position of the imaging lens between the imaging lens and the detection section.

6. The optical displacement measuring apparatus according to claim 5, further comprising:
a detecting optical system which has
a restoration lens for returning detection-subject light having passed through the pinhole optical device to cylindrical-shaped light parallel to the optical axis, and
a truncated cone shaped prism disposed at a position where an apex angle side is opposed to the detection section, to thereby again converge the cylindrical-shaped light parallel to the optical axis having been restored by the restoration lens.

7. The optical displacement measuring apparatus according to claim 2, further comprising:
an incident optical system which has
a polarization beam splitter for changing a direction of the optical axis of the light from the light source to direct the light toward the objective optical system, and
a quarter-wave plate.

8. The optical displacement measuring apparatus according to claim 2, further comprising:
an imaging lens installed between the objective optical system and the detection section, and
a pinhole optical device disposed at a focus position of the imaging lens between the imaging lens and the detection section.

9. The optical displacement measuring apparatus according to claim 8, further comprising:
a detecting optical system which has
a restoration lens for returning detection-subject light having passed through the pinhole optical device to cylindrical-shaped light parallel to the optical axis, and
a truncated cone shaped prism disposed at a position where an apex angle side is opposed to the detection section, to thereby again converge the cylindrical-shaped light parallel to the optical axis having been restored by the restoration lens.

10. The optical displacement measuring apparatus according to claim 1, wherein:
the optical prism is a truncated semi-cone shaped prism formed in a shape of a cylindrical column by trimming a truncated cone shaped prism which includes the broad-area flat portion and the narrow-area flat portion, each of whose flat surface is perpendicular to the optical axis, and includes a truncated conical circumference surface as the connection surface for connecting the broad-area flat portion and the narrow-area flat portion, and shifting a central axis of the narrow-area flat portion from a central axis of the cylindrical column.

11. The optical displacement measuring apparatus according to claim 10, further comprising:
an incident optical system which has
a polarization beam splitter for changing a direction of the optical axis of the light from the light source to direct the light toward the objective optical system, and
a quarter-wave plate.

12. The optical displacement measuring apparatus according to claim 10, further comprising:
an imaging lens installed between the objective optical system and the detection section, and
a pinhole optical device disposed at a focus position of the imaging lens between the imaging lens and the detection section.

13. The optical displacement measuring apparatus according to claim 12, further comprising:
a detecting optical system which has
a restoration lens for returning detection-subject light having passed through the pinhole optical device to cylindrical-shaped light parallel to the optical axis, and
a truncated cone shaped prism disposed at a position where an apex angle side is opposed to the detection section, to thereby again converge the cylindrical-shaped light parallel to the optical axis having been restored by the restoration lens.

14. The optical displacement measuring apparatus according to claim 1, wherein:
the optical prism is a frustum-cylinder shaped prism which includes the broad-area flat portion and the narrow-area flat portion each of whose flat surface is perpendicular to the optical axis, and includes an inclined surface as the connection surface for connecting the broad-area flat portion and the narrow-area flat portion.

15. The optical displacement measuring apparatus according to claim 14, further comprising:
an incident optical system which has
a polarization beam splitter for changing a direction of the optical axis of the light from the light source to direct the light toward the objective optical system, and
a quarter-wave plate.

16. The optical displacement measuring apparatus according to claim 14, further comprising:
an imaging lens installed between the objective optical system and the detection section, and
a pinhole optical device disposed at a focus position of the imaging lens between the imaging lens and the detection section.

17. The optical displacement measuring apparatus according to claim 16, further comprising:
a detecting optical system which has
a restoration lens for returning detection-subject light having passed through the pinhole optical device to cylindrical-shaped light parallel to the optical axis, and
a truncated cone shaped prism disposed at a position where an apex angle side is opposed to the detection section, to thereby again converge the cylindrical-shaped light parallel to the optical axis having been restored by the restoration lens.

18. The optical displacement measuring apparatus according to claim 1, further comprising:
an incident optical system which has
a polarization beam splitter for changing a direction of the optical axis of the light from the light source to direct the light toward the objective optical system, and
a quarter-wave plate.

19. The optical displacement measuring apparatus according to claim 1, further comprising:
an imaging lens installed between the objective optical system and the detection section, and
a pinhole optical device disposed at a focus position of the imaging lens between the imaging lens and the detection section.

20. The optical displacement measuring apparatus according to claim 19, further comprising:
a detecting optical system which has
a restoration lens for returning detection-subject light having passed through the pinhole optical device to cylindrical-shaped light parallel to the optical axis, and
a truncated cone shaped prism disposed at a position where an apex angle side is opposed to the detection section, to thereby again converge the cylindrical-shaped light parallel to the optical axis having been restored by the restoration lens.

* * * * *